(12) United States Patent
Nguyen et al.

(10) Patent No.: US 6,351,971 B1
(45) Date of Patent: Mar. 5, 2002

(54) SYSTEM AND METHOD FOR PRODUCING HIGH PURITY ARGON

(75) Inventors: Tu Cam Nguyen, Tonawanda; Thomas John Bergman, Jr., Clarence Center, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/750,084

(22) Filed: Dec. 29, 2000

(51) Int. Cl.[7] .................................................. F25J 1/00
(52) U.S. Cl. ............................... 62/648; 62/908; 62/924
(58) Field of Search ........................... 62/648, 908, 924

(56) References Cited

U.S. PATENT DOCUMENTS

| | | | |
|---|---|---|---|
| 4,477,265 A | 10/1984 | Kumar et al. ................... 55/26 |
| 4,957,523 A * | 9/1990 | Zarate et al. ................... 92/908 |
| 5,133,790 A | 7/1992 | Bianchi et al. ................. 62/22 |
| RE34,595 E | 5/1994 | Chen et al. ..................... 95/54 |
| 5,313,800 A | 5/1994 | Howard et al. ................. 62/22 |
| 5,469,710 A | 11/1995 | Howard et al. ................. 62/22 |
| 5,555,951 A | 9/1996 | Prasad et al. .................. 62/648 |
| 5,557,549 A | 9/1996 | Chang .................... 364/551.01 |
| 5,730,003 A | 3/1998 | Nguyen et al. ............... 62/648 |

* cited by examiner

Primary Examiner—Ronald Capossela
(74) Attorney, Agent, or Firm—Robert J. Follett

(57) ABSTRACT

A process and system for producing a high purity argon product with high argon recovery from an air feed stream utilizing a low ratio argon distillation column, a high ratio argon distillation column and a vacuum pressure swing adsorption. unit in combination with a cryogenic air separation plant. The process and system avoids the necessity for an ultrastaged upper column in the cryogenic air separator plant.

19 Claims, 4 Drawing Sheets

SYSTEM AND METHOD FOR PRODUCING HIGH PURITY ARGON

FIELD OF THE INVENTION

This invention relates to a system and method for production of high purity argon from a crude argon feed stream received from a cryogenic rectification plant. This invention also relates to a system and method for improving argon recovery from an air feed and a process which is efficient and lower in cost than prior art systems and methods.

BACKGROUND OF THE INVENTION

For many years the classical method employed for the refining of argon included a low ratio column to produce crude argon and to remove the bulk of the oxygen, followed by catalytic deoxidation with hydrogen to remove the final traces of oxygen, and finally a high ratio column to remove nitrogen and the excess hydrogen. Availability of hydrogen and its accompanying high cost made this method a less than desirable technique. More recently the use of superstaged packed columns made it possible to bring the oxygen and nitrogen impurities down to specifications by distillation without the need for catalytic deoxidation with hydrogen.

Nguyen, et al., in U.S. Pat. No. 5,730,003, describe a system for producing high purity argon in which crude argon produced in a cryogenic rectification plant is processed in a pressure swing adsorption unit. The argon-rich stream, at about 13 per cent argon, withdrawn from the ultrastaged upper column contains only about 0.4 ppm nitrogen and about 87 per cent oxygen. Processing this stream in the low ratio column brings the feed to the vacuum pressure swing adsorption (VPSA) system to 98.5 per cent argon, 3 ppm nitrogen and 1.5 per cent oxygen. The VPSA system then removes the oxygen in the argon stream resulting in an oxygen impurity less than 1 ppm and a nitrogen impurity less than 3 ppm. Residual gas from the pressure swing adsorption unit is recycled to the cryogenic rectification plant for recovery of its argon content. High purity argon is cooled prior to recovery against oxygen-containing fluid and is subsequently passed into the cryogenic rectification plant. The integrated VPSA process produces high specification argon product at high recovery and low equipment cost. No high ratio column is employed.

U.S. Pat. No. 5,557,951 of Prasad et al. relates to a method of producing high purity argon using a cryogenic argon column in combination with a solid electrolyte ionic or mixed conductor membrane.

A cryogenic air separation system which improves argon recovery is disclosed by Howard et al. in U.S. Pat. No. 5,469,710, wherein vapor from the argon column top condenser is turboexpanded to generate refrigeration and is then passed into the upper column. No adsorption system is used in the purification process.

U.S. Pat. No. 5,313,800 to Howard et al. describes a process for maximizing the recovery of argon from a double column air separation system having a side arm column for argon recovery. A compositional measurement is made at one or more stages of rectification which exhibit high sensitivity to plant process variations. Total nitrogen content in the argon feed may then be computed by simulated mathematical correlation from such compositional measurement.

U.S. Pat. No. Re 34595 of Chen and Cook describes a process for purifying argon from a cryogenic air separation plant. The argon stream is heated and compressed and then permeated through a solid electrolyte membrane selective to the permeation of oxygen. The purified argon can then be distilled to remove nitrogen.

Bianchi, Bonaquist and Victor disclose a cryogenic rectification method in U.S. Pat. No. 5,133,790 over a defined height within the upper column of a double column system to reduce the nitrogen concentration of an argon, nitrogen, and oxygen mixture while maintaining the argon concentration at or near its maximum, thereby enabling production of nitrogen-free argon directly from the argon column system.

Argon is recovered in U.S. Pat. No. 4,477,265 of Kumar et al. from a gas stream by a vacuum swing adsorption process wherein the gas is passed through an adsorbent bed having thermodynamic selectivity for adsorption of nitrogen and the unadsorbed portion then passed through a second adsorbent bed having kinetic selectivity for retaining oxygen. Both beds are regenerated by vacuum desorption. Further purification of the recovered argon may be carried out, if desired, by catalytic hydrogenation of the residual oxygen. The waste gas from the VSA unit may be recycled to the main column of the cryogenic air separation unit.

SUMMARY OF THE INVENTION

It is therefore an object of this invention to provide a system and process for producing product argon with 99.9999 mol per cent argon with less than 1 ppm oxygen and less than 1 ppm nitrogen. Improvements in the refining of crude argon in a cryogenic air separation system have long been sought. Economic factors along with more stringent purity specifications for argon increase the need for improved processing to more completely eliminate both oxygen and nitrogen from the argon product.

The argon concentration in the air to be processed in an air separation plant is 0.93 per cent. Argon is concentrated near the middle of the upper column of a cryogenic plant to about 13 per cent with 87 per cent oxygen and 550 ppm nitrogen. This argon-rich stream is processed in a low ratio column to produce crude argon by raising the argon concentration to 97.5 per cent with 1 per cent nitrogen and 1.5 per cent oxygen. An objective of this invention is to provide a novel efficient and low cost method and system of removing the remaining concentration of oxygen and nitrogen from the crude argon stream without the need for ultrastaged columns and without requiring dual VPSA systems for oxygen and nitrogen removal.

The method and system of this invention utilizes one or two argon cryogenic distillation columns and a single VPSA system for oxygen removal from the effluent from a low ratio argon column. Nitrogen is eliminated from the crude argon feed stream by utilizing a high ratio column for this purpose. According to the system of this invention, residual gas from the VPSA unit can be recycled back to a cryogenic plant for processing of the argon content in the residual gas thereby providing higher argon recovery. The novel integration of the VPSA system with the cryogenic column system with its unique recycle of argon-rich "residual" gas provides a higher over-all argon recovery than the prior art (92 per cent versus 82 per cent). This coupled with an accompanying reduction in capital cost makes this method and system of this invention a decided improvement over existing technology.

The numerals in the figures are identical for like or common elements in the figures.

DETAILED DESCRIPTION OF THE INVENTION AND PREFERRED EMBODIMENTS

Figure 1:
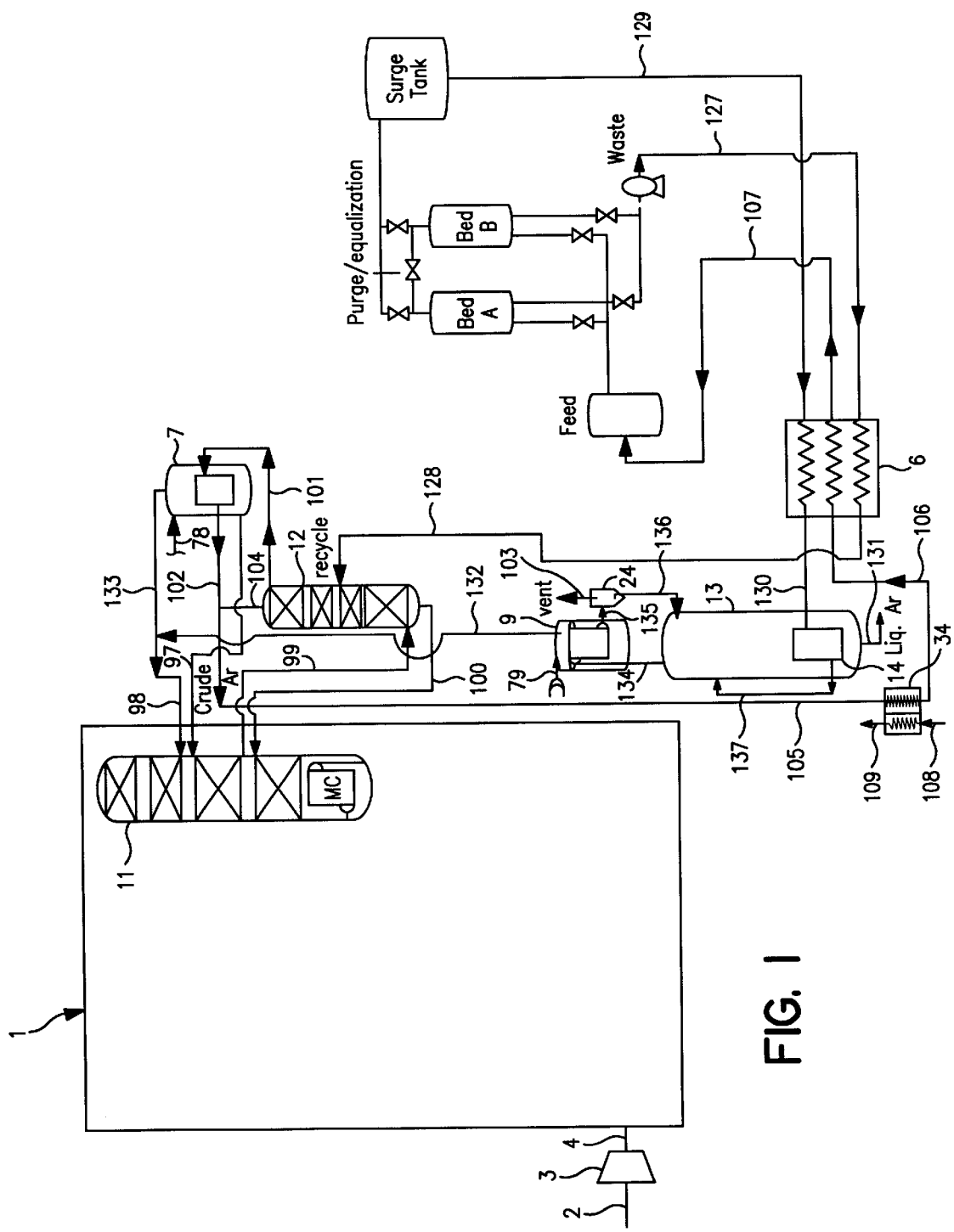
FIG. 1 is a schematic representation of an embodiment of this invention for purifying a crude argon stream from a cryogenic separation unit by employing VPSA for oxygen removal and a high ratio column for nitrogen removal and utilizing liquid head for VPSA feed pressurization.
Figure 2:
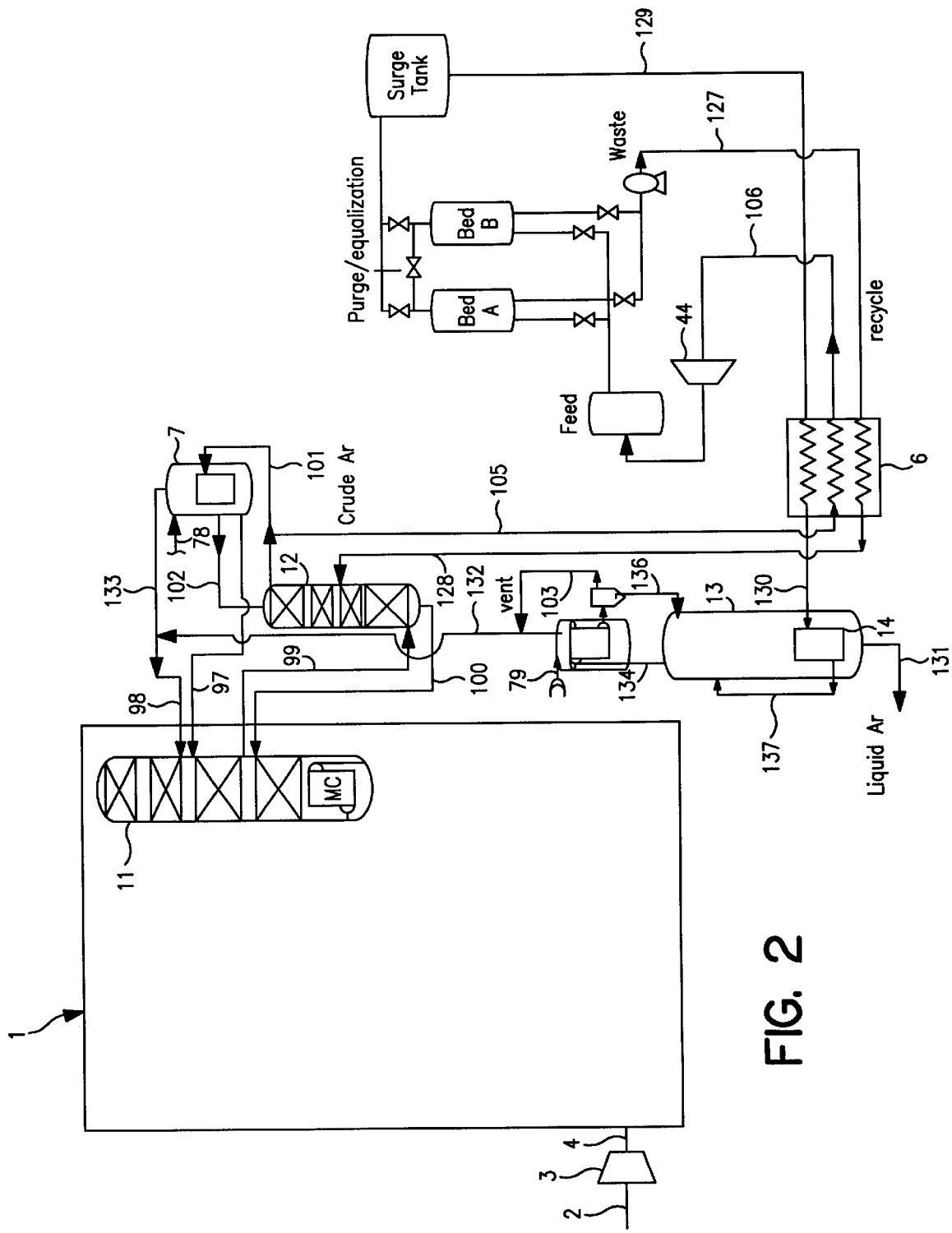
FIG. 2 is a schematic representation of another embodiment of the invention for purifying a crude argon stream from a cryogenic separation unit by employing VPSA for oxygen removal and a high ratio 4 column for nitrogen removal and utilizing a blower for VPSA feed pressurization.

Current methods for producing high purity argon from a cryogenic air separation plant are illustrated in FIGS. 1 and 2 of the previously mentioned U.S. Pat. No. 5,703,003, which is incorporated herein by reference thereto. In such a prior art process, air, prepurified in the conventional fashion, is delivered to the suction of an air compressor. The compressor raises the pressure to about 243 psia and the air is processed in a lower column and upper column in the usual manner, Refrigeration is provided by an expansion turbine which discharges into the lower column. The ultrastaged upper column carries out the separation into liquid oxygen product, pressurized gaseous oxygen product, gaseous nitrogen product, waste nitrogen, and an argon enriched stream devoid of nitrogen. The enriched argon stream is withdrawn from an intermediate point in the ultrastaged upper column and forms the feed to a low ratio column. The composition of the enriched argon stream is about 87 per cent oxygen, 13 per cent argon and 0.4 ppm nitrogen. The low ratio column raises the argon concentration to about 97.5 per cent and reduces the oxygen concentration to about 1.5 per cent in the crude argon stream which is withdrawn near the top of the column. The elevation of the low ratio column provides the pressure (about 38 psia) to drive a VPSA system by virtue of the liquid head in the crude argon stream. An argon reboiler vaporizes the crude argon feed stream and raises its temperature to ambient for processing in the VPSA unit. The VPSA unit removes the oxygen down to a level of 1 ppm. The argon reboiler, an argon heat exchanger and a crude argon condenser desuperheats and liquefies the purified argon product stream leaving the VPSA unit. The argon recovery by such a process is 82.7 per cent.

For purposes of illustrating the present invention, the prior art cryogenic separation unit of general type utilized in the process as just described is illustrated in FIGS. 1 to 4 of this application as a unit without the details thereof except insofar as necessary to illustrate the working of the present invention. Thus, in FIGS. 1 to 4, the cryogenic separation unit is shown as a box designated as 1 and illustrating only compounds thereof necessary for an understanding of the present invention.

Referring first to FIG. 1, a process of this invention is illustrated that demonstrates a method for obtaining purified argon without the necessity for use of an ultrastaged upper column or superstaged low ratio column of the prior art. As illustrated in FIG. 1, air, prepurified in a conventional fashion, is delivered by line 2 to the suction of air compressor 3 where the pressure of the air is raised and is fed by piping 4 to the cryogenic separation unit 1 where separation occurs in a manner customary in the art. From the low pressure (15 to 85 psia), upper column 11 of the cryogenic air separation unit 1 enriched argon stream 99 is provided and fed to a low ratio column 12. The composition of enriched argon feed is about 87% oxygen, 12.9% argon and about 550 ppm nitrogen. The overhead 101 from low ratio column 12 is directed to a crude argon condenser 7 in a single pass heat exchanger where it is totally condensed with a portion of kettle liquid from stream 78 of primarily oxygen and nitrogen obtained from the bottom of a high pressure lower column (not shown) of the cryogenic separation unit 1. The crude argon condensate consists of about 1% nitrogen and about 1.5% oxygen. The condensate from condenser 7 in piping 102 is split into two streams 104 and 105. Stream 104 serves as a reflux to low ratio column 12. The remainder of the crude argon condensate, stream 105, is transferred to crude argon heat exchanger 34 where it is converted to a vapor by boiling against a condensing air stream 108. The elevation of crude argon condenser 7 provides the liquid head to generate the pressure required for operation of a VPSA system, approximately 36 psia. Stream 106, the effluent from the crude argon heat exchanger 34, is routed to argon reboiler 6 where it is warmed to ambient temperature for processing in the VPSA unit.

The operation of the VPSA system functions generally in the manner described in U.S. Pat. No. 5,703,003 to absorb oxygen from stream 107. The oxygen concentration in the VPSA argon rich effluent product stream 129 has been reduced to less than 1 ppm and the nitrogen concentration is about 1 per cent. The argon reboiler 6 then cools the VPSA product steam 129 down to saturation temperature and stream 130 transfers the argon rich stream to reboiler 14 located in the bottom of a high ratio column 13. Here the argon is liquefied and transferred in piping 137 to an intermediate level of high ratio column 13. Vapor from the top of high ratio column 13 is conducted to the high ratio argon condenser 9 by piping 134. Here it is condensed by boiling a portion of kettle liquid from stream 79 of primarily oxygen and nitrogen obtained from the bottom of a high pressure lower column (not shown) of the cryogenic separation unit 1. The vapor from the high ratio condenser 9 is directed by piping 132 to join the vapor from the crude argon condenser 7 in piping 133 to form stream 98. Stream 98 returns the kettle vapor to an intermediate level in upper column 11. The argon liquefied in high ratio argon condenser 9 is directed to separator 24 by piping 135. A small stream of a 50—50 mixture of nitrogen and argon is vented in piping 103 from the top of separator 24. The condensate in stream 136 returns to the top of high ratio column 13 as reflux. Residual stream 127 from the VPSA unit is returned to low ratio column 12 via argon reboiler 6 and line 128. Condensate from low ratio column 12 is recycled to an intermediate level of upper column 11 of separation unit 1 by line 100. Also condensate from crude argon condenser 7 is returned to an intermediate level of upper column 11 via line 97. The nitrogen having been removed by high ratio column 13, high purity liquid argon product is withdrawn from the bottom of high ratio column 13 in line 131. This high purity argon product contains less than 1 ppm oxygen and less than 1 ppm nitrogen. The argon recovery obtained with this processing is 91.8 per cent—9.1 per cent higher than in the prior art.

An embodiment similar to FIG. 1 is illustrated in FIG. 2. However, instead of the crude argon condensate 105 for the VPSA unit coming from crude argon condenser 7, it is supplied from the overhead 101 of low ratio column 12. Therefore, without the crude argon condenser 7 providing the liquid head to generate pressure for operation of the VPSA system, a blower 44 is used for pressurization of the feed 106 to the VPSA system. In this embodiment, the pressure required to process the crude argon stream 106 is developed by crude argon feed blower 44 rather than by the liquid head of the crude argon feed stream 105. Crude argon feed stream 105 is a vapor for this option rather than a liquid. Recycle of the residual stream 127 from the VPSA system is also used in this process to recover the maximum amount of argon. In this embodiment vent stream 103 from separator 24 is returned to upper column 11 of cryogenic separation unit 1 by lines 132, 133 and 98. Since VPSA feed 105 is supplied from overhead 101 of low ratio column 12, the condensate in line 102 from crude argon condenser 7 is all recycled to the low ratio column. The argon recovery associated with FIG. 2 is 92.4 per cent—about 0.6 per cent higher than for FIG. 1 and 9.7 per cent higher than that of the prior art.

Alternative means can be used to thermally integrate the high ratio column 13 into the process. The shelf liquid can be used instead of kettle liquid to pick up the heat duty in the high ratio column condenser and hot fluid such as air can be used to provide the duty for the boilup in the high ratio column.

Figure 3:
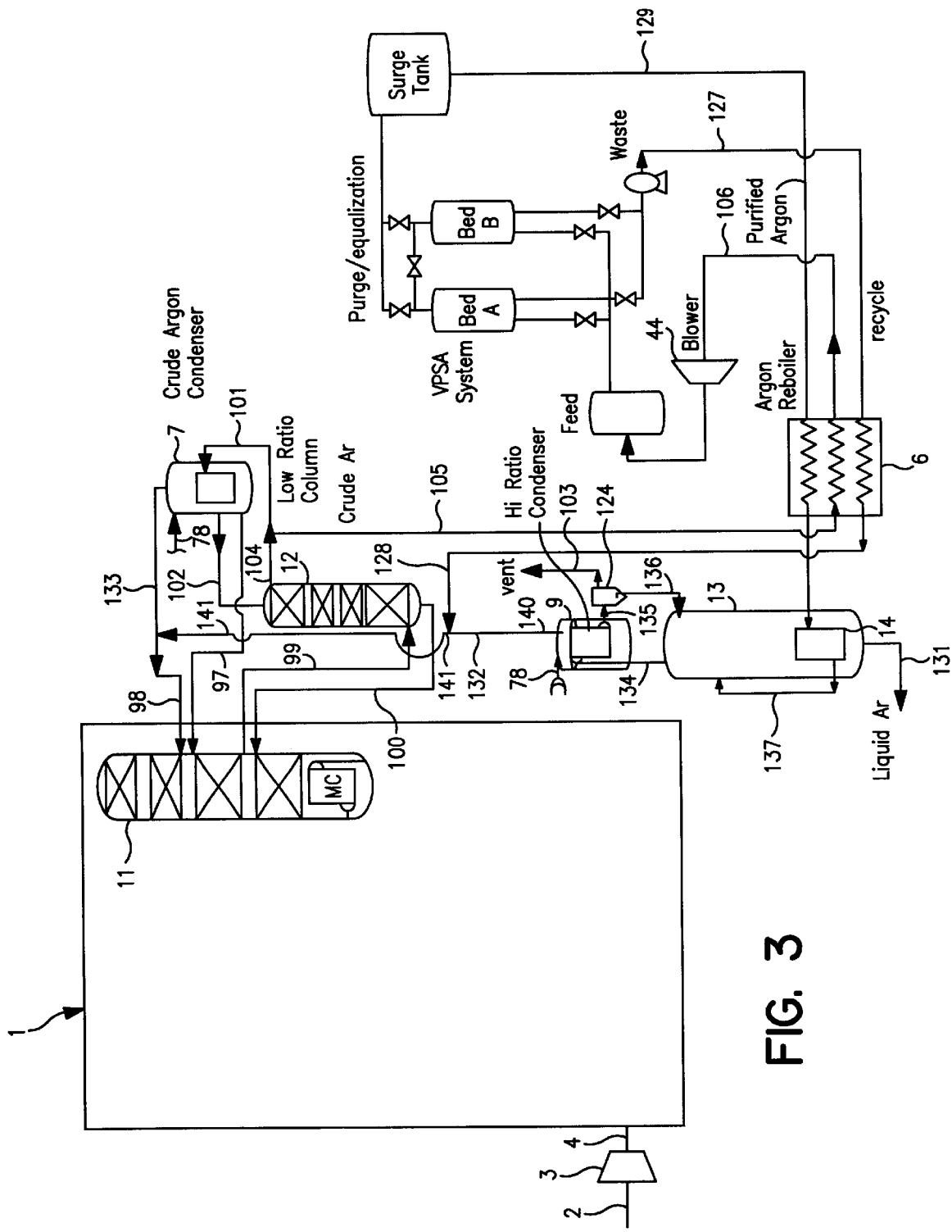
FIG. 3 is a schematic of a further embodiment of the invention for purifying a crude argon stream from a cryogenic separation unit by employing VPSA for oxygen removal and a high ratio column for nitrogen removal and utilizing a blower for VPSA feed pressurization and with recycle of waste gas from the VPSA unit to an upper column of the cryogenic separation unit.

An embodiment similar to that in FIG. 2 is illustrated in FIG. 3. In FIG. 3, the residual stream 127 from the VPSA system, containing about 92% argon, is cooled to a saturation temperature in argon reboiler 6 and the effluent from the reboiler in piping 128, instead of being directed to low ratio column 12, is joined to stream 132, the effluent from high ratio condenser 9, thereby forming stream 141. Stream 141 then joins the vapor from the top of crude argon condenser 7 in stream 133 to form stream 98 which is transferred to upper column 11 where the argon is recovered. A similar processing scheme can be used if liquid head, as was illustrated in FIG. 1, is used for pressurization of the VPSA system rather than the blower.

Figure 4:
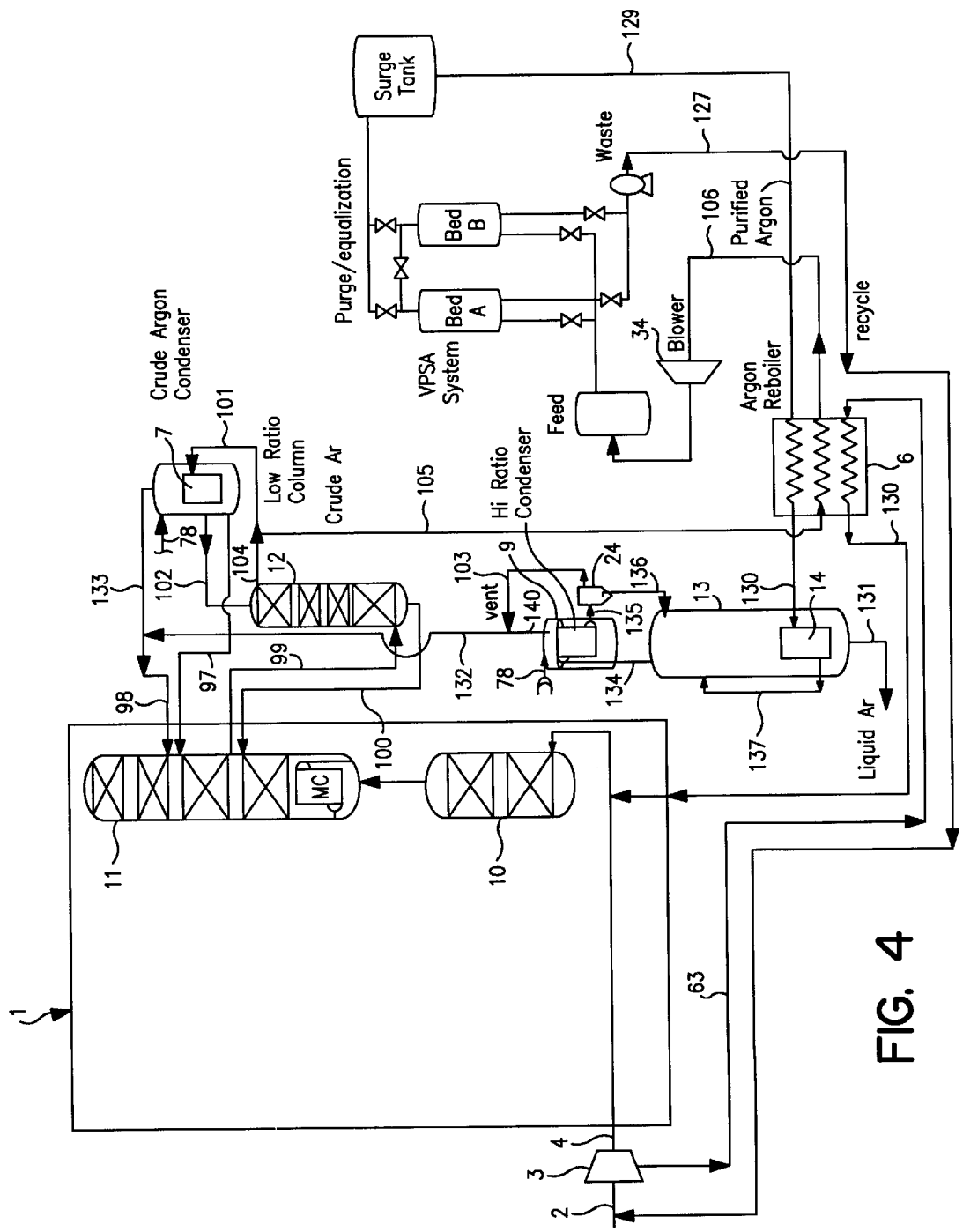
FIG. 4 is a schematic representation of yet another embodiment of this invention for purifying a crude argon stream from a cryogenic separation unit by employing VPSA for oxygen removal and high ratio column for nitrogen removal and utilizing a blower for VPSA feed pressurization and with recycle of waste gas from the VPSA unit to the supply air feed stream of the cryogenic separation unit.

Another variation or embodiment of the invention is illustrated in FIG. 4. In this embodiment, the residual stream 127 from the VPSA system is directed back to the suction of the base load air compressor 3 joining air feed 2.

Stream 63 is removed from the casing of base load air compressor 3 at the stage where the pressure reaches about 90 psia, the pressure of lower column 10 of the cryogenic separation unit 1. Stream 63 is cooled to saturation temperature in argon reboiler 6 before being transferred to the bottom of lower column 10 in line 130. Recovery of the argon then proceeds in the normal manner. As above, a similar processing scheme can be used if liquid head according to FIG. 1 is used for pressurization of the VPSA system rather than the blower.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A process for producing high purity argon product, the process comprising:
   (a) providing a feed air stream to a cryogenic separation unit;
   (b) passing a crude argon feed stream from a lower pressure column of the cryogenic separation unit to a low ratio argon column;
   (c) passing crude argon overhead from the low ratio argon column to a crude argon condenser to produce crude argon condensate;
   (d) passing crude argon, from one of the overhead of low ratio argon column or the crude argon condensate of the crude argon condenser, to a vacuum pressure swing adsorption (VPSA) system as crude pressurized argon fluid, and adsorbing oxygen from the crude pressurized argon fluid to produce an argon enriched stream and a residual stream;
   (e) passing the enriched argon stream from the VPSA to a reboiler in a high ratio column;
   (f) liquefying the enriched argon stream from the VPSA system in the reboiler and transferring the liquefied enriched argon stream to an intermediate level of the high ratio column;
   (g) passing overhead vapor from the high ratio column to a high ratio argon condenser and recycling vapor from the high ratio argon condenser to the lower pressure column of the cryogenic separation unit;
   (h) liquefying argon in the high ratio condenser and returning liquefied argon from the high ratio condenser to the top of the high ratio column as reflux; and
   (i) removing nitrogen in the high ratio column and recovering high purity argon fluid from the bottom of the high ratio column as high purity argon product.

2. The process according to claim 1, wherein the residual stream of step (d) is recycled to an intermediate stage of the low ratio argon column.

3. A process according to claim 1, wherein the crude pressurized argon fluid passed to the VPSA system in step (d) is passed as crude argon condensate from the crude argon condenser.

4. A process according to claim 1, wherein the crude argon fluid passed to the VPSA system in step (d) is passed from the overhead of the low ratio argon column after passing through a pressurizing means.

5. A process according to claim 4, wherein the pressurizing means comprises a blower.

6. The process according to claim 4, wherein the residual stream of step (d) is recycled to an intermediate stage of the upper column of the cryogenic separation unit.

7. A process according to claim 4, wherein the residual stream of step (d) is recycled to the feed air stream of step (a).

8. The process according to claim 1, wherein the residual stream of step (d) is recycled to an intermediate stage of the upper column of the cryogenic separation unit.

9. A process according to claim 1, wherein the residual stream of step (d) is recycled to the feed air stream of step (a).

10. The process according to claim 1, wherein the crude argon feed stream of step (b) comprises about 5 to about 15% argon, up to about 88% oxygen and about 1% nitrogen.

11. The process according to claim 1, wherein the crude pressurized argon fluid of step (d) comprises about 97.5% argon, 1.5% oxygen and about 1% nitrogen, and the argon enriched stream from the VPSA system comprises argon, about 1% nitrogen and about 1 ppm oxygen.

12. The process according to claim 1, wherein the high purity argon product of step (i) contains less than 1 ppm oxygen and less than 1 ppm nitrogen.

13. The process according to claim 12, wherein the argon recovery is at least about 91.8%.

14. A system for producing high purity argon product, the system comprising:

(a) a cryogenic air separation plant with means for passing a crude argon stream therefrom;

(b) a low ratio column for receiving the crude argon stream from the cryogenic air separation plant;

(c) a crude argon condenser for receiving overhead from the low ratio argon column;

(d) a vacuum pressure swing adsorption (VPSA) unit for removing oxygen from crude pressurized argon fluid, received from the low ratio column or from the crude argon condenser, to provide an argon enriched stream;

(e) a high ratio column having a reboiler for receiving the argon enriched stream from the VPSA unit;

(f) a high ratio argon condenser for receiving vapor from the high ratio column and means for recycling vapor from the high ratio argon condenser to an intermediate level of a low pressure column of the cryogenic air separation plant;

(g) a separator for receiving a stream of fluid liquefied in the high ratio argon condenser, the separator having venting means and means for returning the liquefied stream of fluid to the high ratio column as reflux; and (h) means for withdrawing high purity argon product from the high ratio column.

15. A system according to claim 14, additionally comprising blower means for pressurizing crude argon fluid received by the VPSA unit.

16. A system according to claim 15, additionally comprising means for recycling a residual stream from the VPSA unit to an upper column of a cryogenic separation unit.

17. A system according to claim 15, additionally comprising means for recycling a residual stream from the VPSA unit to a feed air stream of a cryogenic separation unit.

18. A system according to claim 14, additionally comprising means for recycling a residual stream from the VPSA unit to an upper column of a cryogenic separation unit.

19. A system according to claim 14, additionally comprising means for recycling a residual stream from the VPSA unit to a feed air stream of a cryogenic separation unit.

* * * * *